Patented Feb. 6, 1934

1,946,114

UNITED STATES PATENT OFFICE 1,946,114

PRODUCTION OF NITROUS OXIDE

Leo Schlecht, Ludwigshafen-on-the-Rhine, and Alfred von Nagel, Mannheim, Germany, assignors to Winthrop Chemical Company, Inc., New York, N. Y., a corporation of New York No Drawing. Application July 25, 1929, Serial No. 381,062, and in Germany August 14, 1928

4 Claims. (Cl. 23—162)

The present invention relates to the production of nitrous oxide.

Hitherto nitrous oxide has been produced on an industrial scale by heating ammonium nitrate. Generally speaking working with large quantities, and especially in a continuous manner, has been attended by difficulty in consequence of the fact that the process is exothermic and that there is therefore a danger of explosion.

We have now found that nitrous oxide can be obtained directly from ammonia in any quantity and by a continuous process, by passing ammonia together with oxygen or gases containing the same, preferably in excess, over catalysts facilitating the oxidation of ammonia to oxides of nitrogen, at elevated temperatures, but preferably below about 550° centigrade, and separating the nitrous oxide from the reaction gases after removal of any nitric oxide and nitrogen dioxide which have been formed. By an excess of oxygen is meant that the ratio $O_2:NH_3$ must be greater than 1, and preferably greater than 2. The process is most suitably carried out between 200° and 550° centigrade, and only small quantities of nitric oxide are thereby produced.

The following catalysts may be mentioned, by way of example, as suitable for employment according to the present invention, namely platinum, iron oxide with the addition of bismuth oxide or manganese oxide, or mixtures of copper oxide with manganese dioxide or of both with silver.

The yield in nitrous oxide is considerably increased, if the speed of the gas mixture containing ammonia and oxygen is so low that the formation of nitric oxide is largely suppressed or does not take place at all. Accordingly the time of contact of the gases with the catalyst is chosen as long as possible, but should not be so long that the nitrous oxide formed is decomposed by contact with the catalyst. The most favourable time of contact depends on the nature of the catalyst and therefore cannot be indicated in a general way. In the case of a catalyst composed of iron oxide with a little bismuth oxide, and also when working with porcelain balls coated with platinum, the best results will usually be obtained when employing about 1000 litres of the gas mixture per hour and per litre of the catalyst.

The temperatures most suitable for this manner of working are below red heat, that is below about 550° C., and the best results are obtained between 200° and 400° centigrade.

Under these conditions the ammonia is converted with a good yield into practically pure nitrous oxide. Nitric oxide and higher oxides of nitrogen are formed not at all or only to a very small extent.

The oxygen is preferably employed in excess, but good yields of nitrous oxide are also obtained with the theoretical quantity of oxygen ($O_2:NH_3=1$) or even with still smaller amounts of oxygen, especially when working at comparatively low temperatures. Such proportions of ammonia and oxygen may be employed that the heat disengaged by the reaction is sufficient to maintain the catalyst at the desired temperature, for example 300° centigrade, without supply or removal of heat.

When working with pure oxygen, instead of gases containing the same, such as air, the process may be carried out in a circulatory system, wherein only part of the nitrous oxide is separated from the reaction gases, if so desired, and the remainder is passed again over the catalyst together with fresh gases. In this way, a reaction gas containing a high percentage of nitrous oxide is obtained, from which the nitrous oxide can be recovered in a more economical manner than from dilute gases. The gaseous mixture can also be conducted through several catalyst chambers arranged one behind the other and the ammonia can be added in stages between the separate layers of catalyst.

In order to obtain the nitrous oxide in a pure state it may be separated, for example by compressing or cooling the gaseous mixture or with the aid of an absorbent or any of these methods combined, after removal of any other oxides of nitrogen which have been formed. If desired, the nitrous oxide can also be recovered from the gases by means of solvents.

In many cases, for example when the nitrous oxide is intended for use for medicinal purposes, it is advantageous to compress the nitrous oxide together with the excess oxygen or gases containing oxygen after removal of the other nitrous gases.

The following examples will further illustrate how our invention may be carried out in practice, but the invention is not restricted to these examples.

Example 1

A mixture of ammonia and oxygen containing 10 per cent of ammonia is passed over a catalyst with a velocity of 6000 litres per hour per litre of the catalyst comprising iron oxide with the addition of 5 per cent of bismuth oxide at a temperature of 350° centigrade. The nitric oxide is removed as nitric acid by subsequent oxidation.

The nitrous oxide is recovered from the residual gas by cooling to low temperatures in a yield of 65 per cent with reference to the ammonia employed.

*Example 2*

A mixture of ammonia and oxygen containing 10 per cent of ammonia is passed, at between 275° and 300° C. and at a speed of 1000 litres per hour and per litre of catalyst, over iron oxide containing 5 per cent of bismuth oxide. 90 per cent of the ammonia is converted into nitrous oxide and the remainder into nitrogen.

If under otherwise equal conditions a mixture of ammonia and air containing 10 per cent of ammonia is used, a yield of nitrous oxide of 87 per cent is obtained.

If the reaction is carried out with a mixture of 1 part of ammonia with 5 parts of air, to which 5 parts of nitrogen are further added in order to avoid the risk of explosions, a yield of nitrous oxide of 81 per cent is obtained.

What we claim is:—

1. The process of producing nitrous oxide which comprises passing ammonia with oxygen over a catalyst promoting the catalytic oxidation of ammonia, at a temperature between about 200° and 550° C. and at so low a speed, that the formation of nitric oxide is substantially suppressed, but sufficiently rapidly to prevent the ammonia from being substantially converted into elementary nitrogen, and removing nitric oxide and higher oxides of nitrogen from the resulting gas.

2. The process of producing nitrous oxide which comprises passing ammonia with an excess of oxygen over a catalyst promoting the catalytic oxidation of ammonia, at a temperature between about 200° and 550° C. and at so low a speed, that the formation of nitric oxide is substantially suppressed, but sufficiently rapidly to prevent the ammonia from being substantially converted into elementary nitrogen, and removing nitric oxide and higher oxides of nitrogen from the resulting gas.

3. The process of producing nitrous oxide which comprises passing ammonia with a large excess of oxygen over a catalyst, capable of promoting the catalytic oxidation of ammonia, at a temperature between about 200° and 400° C. and at a speed of about 1000 litres of gas mixture per hour per litre of catalyst.

4. The process of producing nitrous oxide which comprises passing ammonia with a large excess of oxygen over a catalyst, capable of promoting the catalytic oxidation of ammonia, at a temperature between about 200° and 400° C. and at a speed of from about 6000 to 1000 liters of gas mixture per hour per liter of catalyst.

LEO SCHLECHT.
ALFRED von NAGEL.